March 31, 1942. LE ROY T. BARNETTE 2,277,673
MEANS FOR MAKING MOLDED ARTICLES
Filed July 21, 1938   2 Sheets-Sheet 1

INVENTOR.
LE ROY T. BARNETTE
BY
HIS ATTORNEY.

March 31, 1942.   LE ROY T. BARNETTE   2,277,673
MEANS FOR MAKING MOLDED ARTICLES
Filed July 21, 1938   2 Sheets-Sheet 2
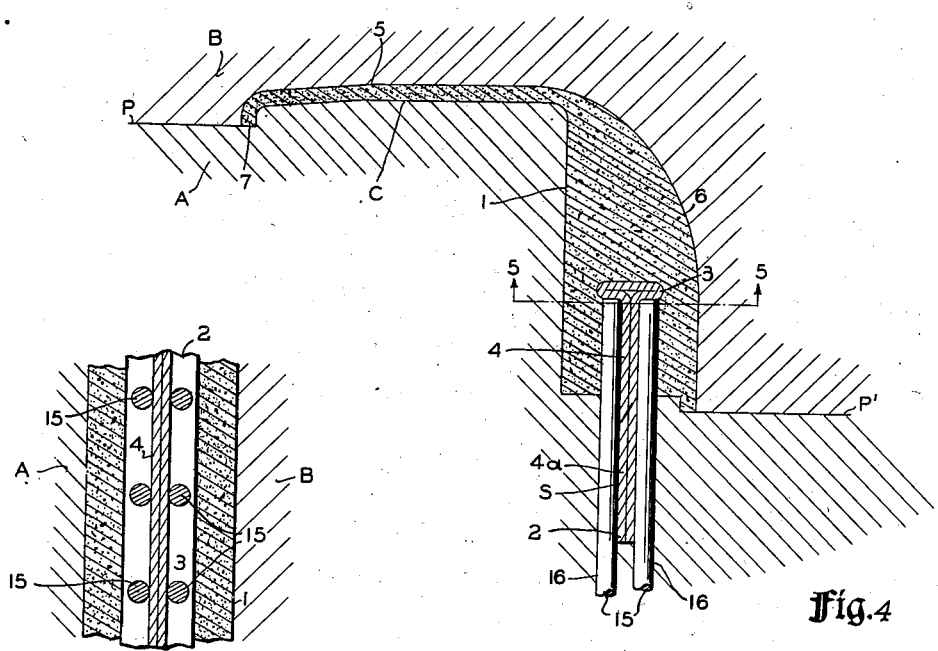
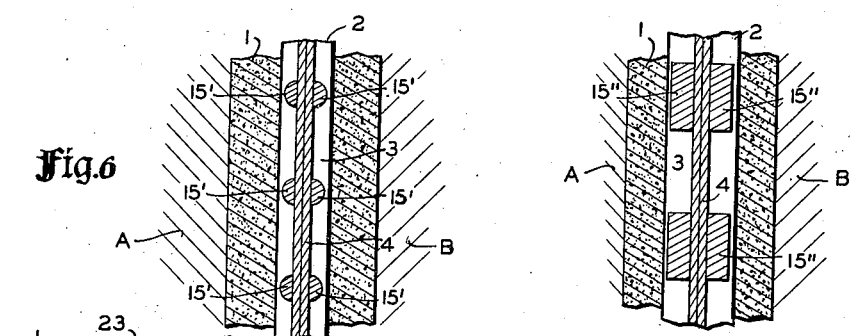
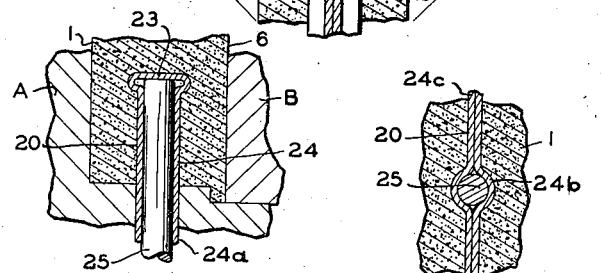
INVENTOR.
LE ROY T. BARNETTE
HIS ATTORNEY.

Patented Mar. 31, 1942

2,277,673

UNITED STATES PATENT OFFICE 2,277,673

MEANS FOR MAKING MOLDED ARTICLES

Le Roy T. Barnette, St. Clair, Mich., assignor, by mesne assignments, to The Standard Products Company, Port Clinton, Ohio, a corporation of Ohio Application July 21, 1938, Serial No. 220,527

2 Claims. (Cl. 18—36)

This invention relates to an improvement in the molding of plastic materials, examples of which materials are the various thermosetting synthetic resins and esters and thermoplastic materials such as cellulose acetate. The invention relates more specifically to the making of objects from plastic materials in suitable mold cavities under high pressure as in the injection molding of plastics.

An object is to provide a simple and effective mold apparatus for making composite articles including an insert and partially or wholly enveloping hardenable plastic material embracing such insert.

Other objects include the provision of a new composite article of manufacture including molded plastic material, and more specifically a garnish molding for window and other openings as in coupe or sedan types of automobile bodies.

Other objects and advantages will become apparent from the following specification wherein reference is made to the drawings, showing exemplary embodiments of the invention including one manner of practicing the method.

In the drawings:

Fig. 4 is a sectional view through cooperating mold sections or dies in which articles such as referred to above may be formed—this view showing a cavity portion, such as would be used to make the portion of the article shown by Fig. 3;

Fig. 5 is a fragmentary sectional view of the mold sections, cutting insert supports as indicated by the line 5—5 on Fig. 4;

Figure 1:
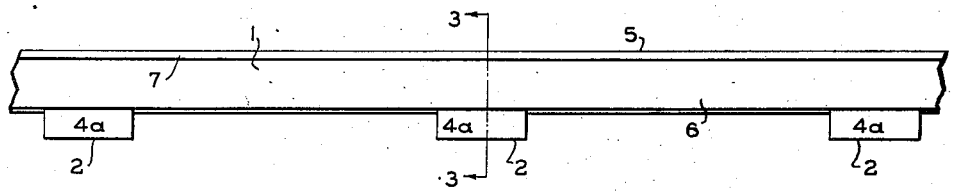
Fig. 1 is a top edge view or plan of a garnish molding or frame which has metal inserts embedded in the plastic material forming the main body of the molding and extending therefrom.

Figs. 6 and 7 are views similar to Fig. 5, showing modified forms of locating pins or members for inserts to be embedded in the plastic; and Figs. 8 and 9 are detail views showing further modification and corresponding to Figs. 4 and 5.

As applied to garnish molding or window framing 1, the inserts may comprise T-headed sections of sheet metal shown at 2, the head portions 3 and leg portions 4 of which are embedded in the plastic material, and leg portions 4a of which extend out of it, as for attachment of the molding to frame portions of a window or door or for securing parts such as weather sealing strips to the molding. Such inserts 2 may be in short similar sections located at various positions around the garnish molding or may be in one section substantially coextensive with the molding.

Figure 2:
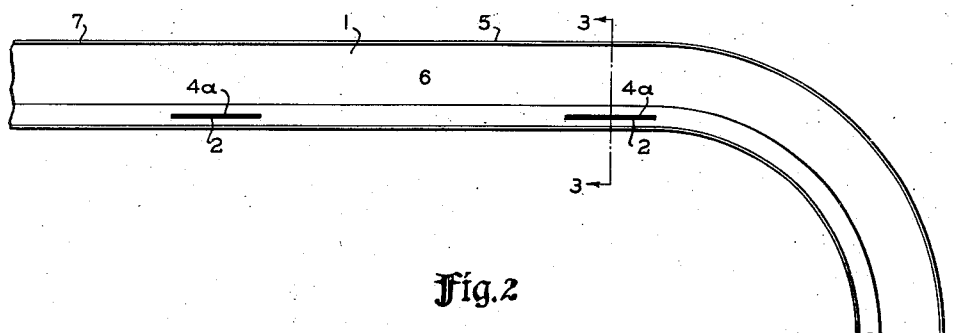
Fig. 2 is a partial rear view of such garnish molding or frame.
Figure 3:
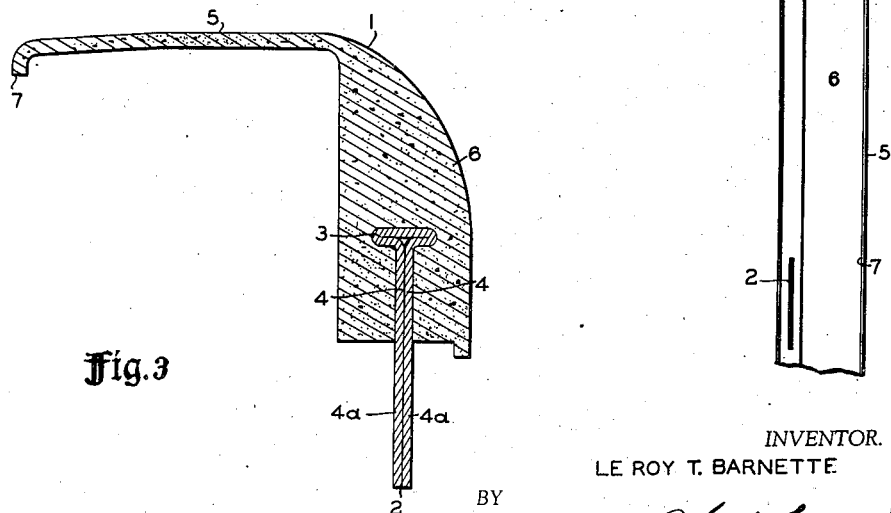
Fig. 3 is a transverse sectional view through a portion of the molding or frame as indicated by the line 3—3 on Fig. 2.

An upper frame portion of a garnish molding on the order of that shown in application, Serial No. 201,469, filed by James S. Reid, April 12, 1938, now Patent No. 2,138,710, is shown in Fig. 2 of the drawings hereof. The garnish molding can be a continuous frame member, the upper portions only of which are shown in Figs. 1 and 2 hereof. The configurations of different parts of the molding vary as required by installation factors, but for the purpose of illustration of the principles hereof, the cross section may be considered to be substantially as shown in Fig. 3 throughout. As illustrated in Fig. 3, the molding comprises two angularly disposed flange portions 5 and 6, the former being relatively thin and having an inturned flange 7 extending along it's edge so that the molding is in operative effect a channel, the flange portion 5 of which is the web. The flange portions 5 and 7 overlie or make contact with the outer surface of an automobile body as adjacent a window opening in a door, and the thicker flange 6 extends toward the transparent pane of such window. The molding can be secured in place in various ways, as by screws passing transversely through the thickened flange 6 or by means of the inserts 2, the projecting parts of which may be fashioned to serve as attaching members in any suitable manner.

In the injection molding of plastic material, such, for instance, as cellulose acetate, the pressures required are greater in the making of large molded articles than in the case of smaller articles, and it becomes an important problem in an article such as a garnish molding to make certain that inserts, particularly if they are light in weight, shall be held in the mold cavity against distortion by movement of the plastic material in the cavity. The material is injected under enormous pressures and if introduced at one side of an insert such as shown, the pressure is likely to displace or bend the insert to such an extent that the molding will have to be scrapped.

Referring to Fig. 4, the mold section or die block A cooperates with a mold section or die block B to form a cavity C which mold sections separate as along the parting planes P and P', these being at different elevations as shown. Spruing or gating of the molds may be done in any suitable manner, not shown, for instance, in accordance with the disclosures of the prior application above mentioned. The T-head portion 3 of the insert and portions 4 of the legs as shown extend into the cavity. Other portions of the legs are snugly supported in a slot S of the lower mold section or die block A, so that the injected plastic material will be prevented from following the leg portions 4a beyond the mold cavity C. Now, in order to prevent displacement of the T-head and distortion or displacement of the leg portions while in the cavity, the mold section A is provided with a series of pins 15 which can extend from parallel bores 16 in the mold section A located closely adjacent the slot S (as in tangential relation to the walls of the slot in the case of using round pins such as shown in Fig. 5) so that the pins have surfaces which contact directly opposite each other with the leg portions 4 of the insert and other surfaces with both arms of the T-head.

Such pins as 15 can be fixed in the bores 16 or movably mounted therein so that, in the latter case, the pins can serve as ejectors for the composite molded article. If the pins 15 are to serve as ejectors for the molded piece, then any known form of operating means for the ejector pins can be employed to thrust against the outer ends thereof, as well understood in the art. Fig. 6 illustrates that the pins designated 15' can be semi-circular in section with their flat sides in supporting engagement with the insert portions 4 in the mold cavity. This arrangement is preferably employed where the head portion of the insert is relatively narrow and, in order to increase the area of contact between the heads and pins while confining the pins between parallel planes spaced no wider than the heads.

As shown in Fig. 7, the pins 15" are rectangular in section and spaced apart a distance substantially corresponding to the longer sectional dimension of the pins so that the inserts are adequately held against distortion by the incoming plastic at short intervals, while allowing adequate interlocking contact of the head and leg portions of the insert and the plastic material between the pins.

In the event of using hollow inserts which extend into and for substantial distances along the molded article, the supporting members corresponding to 15, 15' and 15" can extend within the hollow insert in supporting engagement with its inner walls either continuously or at spaced regions depending upon the design of the insert. For instance, in the case of a generally U-shaped light gage sheet metal insert, a single supporting member carried by a mold section corresponding to that indicated at A, can enter the insert and support it continuously from end to end. This needs no specific illustration in view of Fig. 8, described below.

Referring to Figs. 8 and 9, the insert 20 having a head portion 23 and leg portions 24 and 24a can be supported as by a series of spaced pins 25 (one being shown) extending from the mold section A into spaces 24b afforded by spreading apart opposite portions of the insert, which spaces are accurately located so as to receive the pins. Beyond the spaces 24b, in the principal direction of extent of the insert, the leg portions of the insert are brought close together as indicated at 24c so that dislocation and distortion of the insert during the molding process will be prevented by the pins while maintaining the pins out of contact with the molded material.

It will be understood that the inserts can be of shapes otherwise than as shown. For instance, they can be single strips of metal with laterally diverted portions of any shape and at any position such that the diverted portions interlock with the plastic; for instance, protuberances located between adjacent pins. The portions of the inserts which extend out of the finished molding can be varied as desired in accordance with the type of attachment or use to be made of the inserts.

I claim:

1. A mold having separable sections which cooperate to form a cavity adapted for molding plastic hardenable material around an elongated relatively thin sheet material shouldered insert which lies partly within and partly without the mold cavity with the general plane of its sheet vertical and which thereby inherently is laterally bendable by the heavy pressure of injection molding, the portion of said insert lying without said cavity being seated in a fitted depression in one of said separable sections, one mold section being provided with relatively stiff rod-like members extending upwardly into said cavity and spaced at intervals along the same in two parallel rows, and thereby adapted at their upper ends to engage shoulders of said insert to support the same and at their sides to abut opposite surfaces of the insert sheet and resist lateral bending or deflection thereof in both directions out of the plane of the sheet by the heavy pressure of the injected plastic material.

2. A mold having separable sections which cooperate to form a cavity for molding plastic hardenable material around an elongated relatively thin sheet material insert of generally T-form which lies partly within and partly without the mold cavity with the general plane of its flange horizontal and of its web vertical and which thereby inherently is laterally bendable by the heavy pressure of injection molding, the portion of said web lying without said cavity being seated in a fitted depression in one of said separable sections, one mold section being provided with parallel relatively stiff rod-like members extending upwardly into said cavity and spaced at intervals along the same in two parallel rows and thereby adapted at their upper ends to engage beneath shoulders of the flange of said insert to support the same and at their sides to abut opposite surfaces of the insert web and resist lateral bending or deflection thereof in both directions out of the plane of the sheet by the heavy pressure of the injected plastic material.

LE ROY T. BARNETTE.